Aug. 27, 1963 R. G. LE TOURNEAU 3,102,219
MOTOR CONTROL SYSTEM FOR ELECTRICALLY POWERED VEHICLES
Filed Jan. 22, 1962
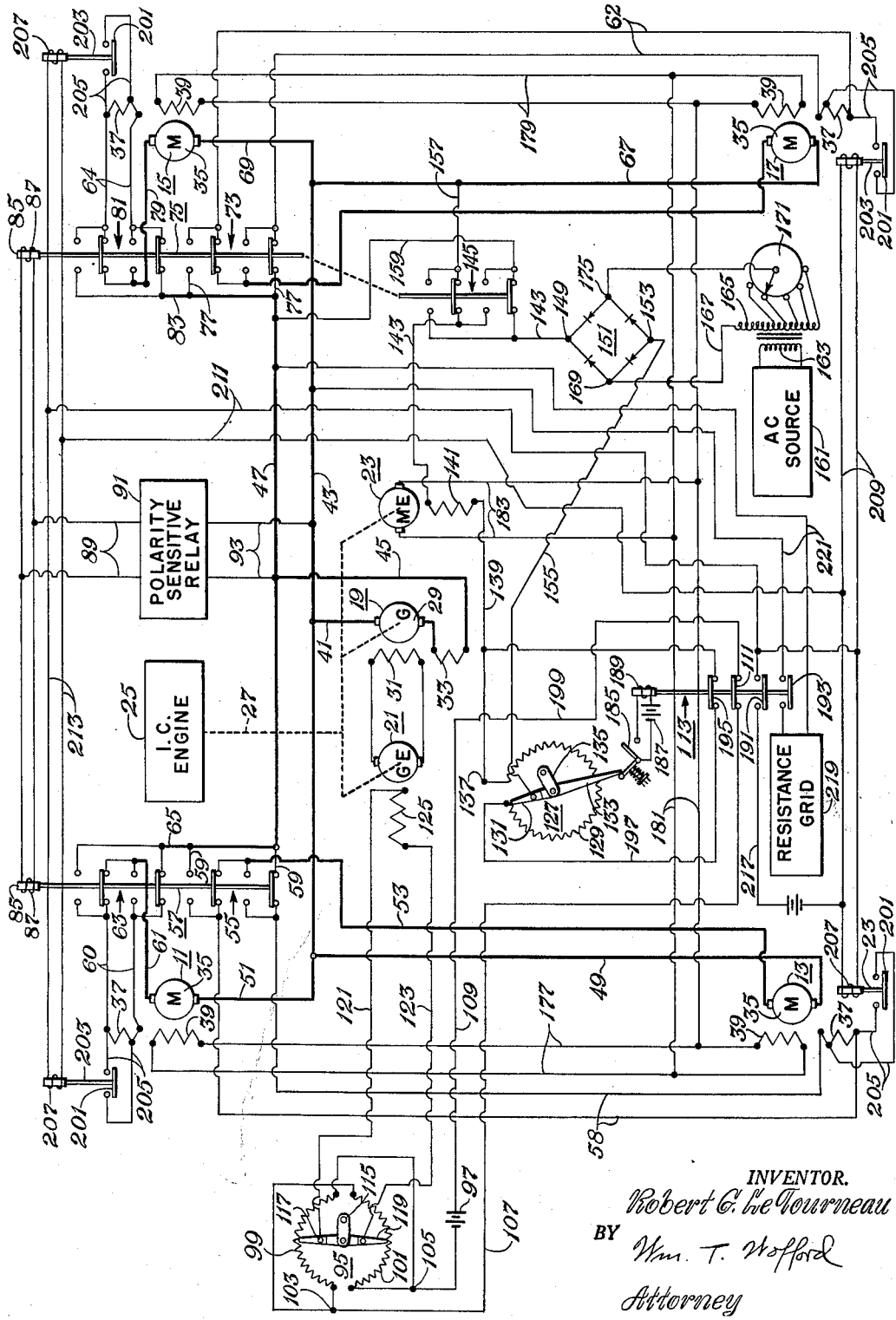
INVENTOR.
Robert G. Le Tourneau
BY Wm. T. Wofford
Attorney

United States Patent Office 3,102,219
Patented Aug. 27, 1963

3,102,219
MOTOR CONTROL SYSTEM FOR ELECTRICALLY POWERED VEHICLES
Robert G. LeTourneau, P.O. Box 2307, Longview, Tex.
Filed Jan. 22, 1962, Ser. No. 167,782
8 Claims. (Cl. 318—145)

The present invention relates to control systems for electrically powered vehicles, and more particularly to systems, apparatus and arrangements for controlling vehicles wherein the vehicle wheels are driven by electric motors which are supplied power from a generator which in turn is powered by an internal combustion engine.

Many types of control systems have been devised in the prior art of which I am aware, for various applications involving vehicles driven by electric traction motors supplied from internal combustion engine driven generators, a notable example being diesel-electric trains. However, the particular type of application with which my invention is primarily concerned, though quite old in general concept, is really quite new insofar as actual practice is concerned. This general concept is that of the heavy duty type self-propelled rubber tired off-road vehicle and/or mobile self-propelled work performing machine. Machines of this general class include by way of example off-road transport vehicles, earthmoving and earthworking machines, such as scrapers, dozers, tractors and haulers, land clearing machines, logging machines, mobile cranes, and the like. It is only recently that such machines have been electrically powered to a practical commercial extent; that is, having an internal combustion engine or engines drive a generator or generators to supply electric power to vehicle wheel motors as well as to the other functions of the machine. The requirements for the electrical systems of such machines are quite severe. The electrical system of such machines must cope with wheel motor load and speed changes that are quite rapid and extend over a wide range. Also, such machines must run in reverse as well as forward, and in many cases must be reversed numerous times in the course of a day's operation. Further, such machines should logically have an effective dynamic braking system since the braking demands are much too severe for friction brakes alone.

The general object of the present invention is to provide improved control apparatus, systems, and arrangements for vehicles of the general class above-mentioned.

More specifically it is an object of the present invention to provide improved dynamic braking arrangements for vehicles of the general class above-mentioned.

Another object of the present invention is to provide improved forward to reverse and vice versa control arrangement for vehicles of the general class above-mentioned.

Another object of the present invention is to provide improved running to dynamic braking and vice versa control arrangements for vehicles of the general class above mentioned.

These and other objects are effected by this invention as will be apparent from the following description taken in accordance with the accompanying drawing, forming a part of this application, in which:

The single figure is a schematic circuit diagram showing control systems and arrangements in accordance with a preferred embodiment of the invention.

Referring now to the drawing, there are shown four direct current traction motors, 11, 13, 15, 17. These motors are incorporated into self-contained vehicle wheel drive units. Such wheel drive units include a gear reduction built into the wheel structure, with the traction motor driving the gear reduction. The wheel drive units are then mounted to the vehicle axles. For details of such wheel drive units (sometimes referred to as "electric wheels") reference is made to my U.S. Patent No. 2,726,726. For purposes of discussion herein, the vehicle will be assumed to have four wheels, each of which is an "electric wheel." It should be understood, however, that the present invention is applicable also to vehicles having either less than or more than four "electric wheels."

Also shown in the drawing is a single direct current generator 19, a generator exciter 21, and a motor exciter 23, all driven by an internal combustion engine (shown as a block 25) via conventional mechanical linkages indicated by the dotted lines 27. While only one engine and generator is shown, the present invention is also applicable in cases where more than one engine-generator set is used, with the generators operating in parallel. The generator is preferably of the differential compound type, having an armature 29, a shunt field winding 31, and a series field winding 33, and each direct current traction motor is preferably of the cumulative compound type, having an armature 35, a series winding 37, and a shunt winding 39.

One side of the generator armature 29 is connected via lead 41 to a first main line bus 43, while the other side of the generator armature 29 is connected in series with the generator series field winding 33 and via lead 45 to a second main line bus 47. The left front wheel motor 13 has one side of its armature 35 connected via lead 49 to the first main line bus 43, and the right front wheel motor 11 has a corresponding side of its armature 35 connected via lead 51 to the first main line bus 43. The left front wheel motor 13 has the other side of its armature 35 connected via lead 53 to a first set of contacts 55 of a first reversing relay 57, via lead 58, in series with the motor series field winding 37, and via leads 59 to the second main line bus 47. The right front wheel motor 11 has the other side of its armature 35 connected via lead 61 to a second set of contacts 63 of the first reversing relay 57, via leads 60 in series with the motor series winding 37, and via lead 65 to the second main line bus 47. Similarly, the left rear wheel motor 17 has one side of its armature 35 connected via lead 67 to the first main line bus 43, and the right rear wheel motor 15 has a corresponding side of its armature 35 connected via lead 69 to the first main line bus 43. Also similarly, the left rear wheel motor 17 has the other side of its armature 35 connected via lead 71 to a first set of contacts 73 of a second reversing relay 75, via leads 62 in series with the motor series field winding 37, and via leads 77 to the second main line bus 47, while the right rear wheel motor 15 has the other side of its armature 35 connected via lead 79 to a second set of contacts 81 of the second reversing relay 75, via leads 64 in series with the motor series field winding 37, and via lead 83 to the second main line bus 47. In brief, all wheel motors 11, 13, 15, 17 are connected in parallel across output terminals of the generator 19, and all wheel motor series field windings 37 are arranged to be reversed by action of the respective first and second reversing relays 57, 75.

Each of the first and second reversing relays 57, 75 has a respective armature 85, which is mechanically linked to the respective contact sets 55, 63, 73, 81. Each contact set is in effect a double pole double throw reversing switch, with the respective series winding 37 connected across the center poles. Each reversing relay armature 85 has an operating coil 87. The operating coils 87 are connected in parallel and via leads 89 to the output terminals of a polarity sensitive relay (shown as a block 91), the input terminals of which are connected via leads 93 across the main line buses 43, 47. The polarity sensitive relay 91 may be of any suitable type, the requisite characteristics and function of which will be hereinafter explained.

The main or running controller for the vehicle is a potentiometer 95 supplied from a direct current source such as a battery 97 and arranged to have a voltage output which is continuously variable from zero up to a predetermined magnitude, both positive and negative. The main controller potentiometer 95 is made up of a first resistance segment 99 and an oppositely disposed second resistance segment 101. The first and second resistance segments 99, 101 are connected in reverse parallel fashion to a pair of input terminals 103, 105. The input terminals 103, 105 are also connected via leads 107, 109 in series with battery 97 and a normally closed contact 111 of a dynamic braking relay 113. The main controller potentiometer 95 has a control handle 115 which moves a pair of diametrically opposed slider contacts 117, 119 along the respective resistance segments 99, 101. The controller output voltage is taken from these slider contacts 117, 119 which are connected via leads 121, 123 in series with the shunt winding 125 of the generator exciter 21.

Dynamic braking for the vehicle is controlled by a dynamic braking potentiometer controller 127 acting in conjunction with the dynamic braking relay 113. The dynamic braking variable resistance controller 127 has a single resistance segment 129 plus a slider contact 131 which is fixed to a control arm 133 which is variably positioned by means of a control handle 135. One end of the resistance segment is open, while the other end is connected via terminal 137 and lead 139, in series with the shunt winding 141 of the motor exciter 23 and via lead 143 through a set of contacts 145 of reversing relay 75, and via lead 147 to a first terminal 149 of a rectifier bridge 151, and from a second terminal 153 of the bridge 151 and via lead 155 to the sliding contact 131. The set of reversing relay contacts 145 amounts to a double pole double throw switch having its center poles connected respectively via leads 157 and 159 across the main line buses 43, 47.

A source of alternating current voltage, shown as a block 161, has its output terminals connected across the primary 163 winding of a transformer which has a tapped secondary winding 165. One end of the secondary winding 165 is connected via lead 167 to a third terminal 169 of the bridge rectifier 151. The taps of the secondary winding 165 are connected to the input terminals of a tap switch 171, the selector control of which is connected via lead 173 to the fourth terminal 175 (opposite the third terminal 169) of the bridge rectifier 151. The general function of the alternating current source 161, the bridge rectifier 151, and the set of reversing switch contacts 145 is to supply appropriate excitation for the motor exciter shunt winding 141 for various operating conditions, as will be hereinafter more fully explained.

The motor shunt fields 39 are all connected in parallel via leads 177, 179, 181, and via leads 183 across the armature output terminals of the motor exciter 23.

The arm 133 of the dynamic braking controller 127 also controls a single pole single throw spring biased switch 185 which is connected in series with a direct current voltage source (shown as a battery 187) and the energizing coil 189 of dynamic braking relay 113. The armature of the braking relay carries two normally open contacts 191, 193 and two normally closed contacts 111, 195. When the dynamic braking controller 127 is in the off or non-braking position (as shown), the arm 133 retains the spring biased switch 185 in the open position, so that the relay coil 189 is in the de-energized, or normal, position. One of the braking relay normally closed contacts 195 is connected in series with leads 197, 199, to shunt, or by-pass the resistance 129 of the potentiometer. The other normally closed contact 111 is connected via leads 107, 109, in series with a direct current voltage source (shown as a battery 97) across the input terminals 103, 105, of the main controller potentiometer 95.

Each vehicle traction motor series field winding 37 has a normally open contact 201 of a relay 203 connected via leads 205 in shunt with a major portion of the winding turns. The energizing coils 207 of the motor series field shunting relays are connected in parallel via leads 209, 211, 213, and are energized from a direct current voltage source (shown as a battery 215) which is connected in series, via lead 217, with the first normally open contact 191 of the dynamic braking relay 113 across the energizing coils of the shunting relays 207.

A dynamic braking energy dissipating resistance grid (shown as a block 219) is connected in series with the second normally open contact 193 of the dynamic braking relay 113 and via leads 221 across the main line buses 43, 47.

Operation of the electrically powered vehicle control system in accordance with my invention will now be explained. The positions of the controls as shown by the drawing represent the condition wherein the vehicle is parked and ready for movement in the forward direction. The electric wheel motors of the vehicle are preferably provided with electromagnetic friction brakes (not shown) of a type which may be set or released by the vehicle operator as desired, and particularly for parking the vehicle.

Vehicle Forward Operation

Assuming that the vehicle engine 25 is running, and that it is desired to move the vehicle forward, it is only necessary to move the main controller potentiometer 95 away from its neutral position (assume clockwise movement for forward vehicle motion). A direct current voltage of proper polarity will immediately be applied to the field 125 of the generator exciter 21, which in turn will cause the generator exciter to supply direct current voltage of proper polarity to the generator shunt field 31, whereupon the generator output voltage will appear across the main line buses 43, 47. For convenience, it is assumed that bus 43 will be positive and bus 47 will be negative for vehicle forward motion. The main line bus voltage (generator output voltage) is of course applied to the armatures of all of the wheel motors.

The wheel motor shunt fields 39 are supplied direct current voltage from the output of the motor exciter 23. The motor exciter shunt field 141 is in turn controlled by direct current voltage supplied from the output terminals of the bridge rectifier 151. This rectifier output is always the algebriac sum of a voltage supplied from the A.C. source 161 and main line bus voltage. In other words, the alternating current voltage is rectified by the bridge rectifier 151 and added in opposition to (bucked by) the main line bus voltage. For additional details of the motor excitation control system, reference is made to my copending application S.N. 96,461, filed March 17, 1961.

Thus, with armature voltage and shunt field excitation applied to the wheel motors, the vehicle will move forward. It should be noticed that the only control function necessary to start forward motion of the vehicle was to move the main controller potentiometer 95 clockwise away from its neutral position. No additional switches or relays or contactors were involved in this operation.

Assuming that the vehicle initially is lightly loaded, the generator output voltage will be relatively high, and a substantial amount of the rectified alternating current voltage will be bucked out, resulting in relatively light motor shunt field excitation, allowing the vehicle to run under what may be termed a high speed, low torque condition. For the initially assumed light load condition, the further the main controller 95 is advanced clockwise away from neutral, the faster the vehicle will travel. With the main controller fully advanced, the generator output voltage will be maximum and the rectified alternating current voltage will be nearly all bucked out, resulting in minimum motor shunt field excitation, and in maximum vehicle speed. The motor exciter may be provided a pilot shunt field (not shown) to prevent complete collapse of the motor shunt fields. When the vehicle is operating under heavy load conditions, the generator output voltage is reduced (it is a differential compound generator), and a minimum of the rectified alternating current voltage is bucked out, so that maximum voltage is applied to the motor exciter field 141, resulting in maximum motor shunt field excitation, which may be termed the low speed high torque operating condition. The motor series fields 37 of course also produce more torque with increased load. To stop the vehicle forward motion, it is only necessary to return the main controller 95 to its neutral position.

The speed-torque characteristics of the motors, the generator, and the motor and generator excitation systems are all designed so as to produce a coordination of vehicle speed, and torque such that the rated available horsepower of the internal combustion engine 25 will be fully utilized to the maximum possible extent under all vehicle operating load conditions.

Vehicle Reverse Operation

To move the vehicle in the reverse direction, it is only necessary to move the main controller 95 counterclockwise away from its neutral position. This will cause voltage of opposite polarity to be applied to the generator exciter 125, which in turn will apply a voltage of opposite polarity to the generator shunt field 31, causing the generator output voltage to reverse its polarity. The vehicle can of course go to the reverse direction of operation from a standstill, but can also just as readily go from forward operation to reverse operation and vice versa. In other words, the main controller 95 can be moved from a clockwise (forward) position through neutral and to a counterclockwise (reverse) position, or vice versa, and such action is a normal operation. The position of the motor reversing relays 57, 75 is determined by the polarity of the main line bus (generator output) voltage. When the polarity of bus 43 is positive, the relays 57, 75 are in the position shown and the vehicle is set up for forward motion. When the plarity of bus 43 is negative, the relays are energized to the reverse position and the vehicle of course is then set up for reverse motion.

The device which controls the actuation of the motor reversing relays is the polarity sensitive relay 91. This polarity sensitive relay detects the polarity of the main line busses and actuates the motor reversing relays 57, 75 accordingly. The polarity sensititve relay 91 is designed to operate at very low levels of input voltage. In other words, when there is a change of polarity of the main line bus voltage, the polarity sensitive relay will detect the polarity change and actuate the motor reversing relays 57, 75 while the main line bus voltage is at a very low level. This means, of course, that the motor reversing relay switching is done at very low current levels. Since devices which are capable of performing the function of the polarity sensitive relay are well known to those skilled in the art, details of a polarity sensitive relay per se are not shown or described herein.

Assume now that the vehicle has been travelling in the forward direction and the main controller 95 is moved counterclockwise through and beyond the neutral position. Immediately when the main line bus reverses polarity, the polarity sensitive relay 91 energizes the coils 87 of the motor reversing relays 57, 75 and the contacts of those relays are actuated to the reverse position. This action, via contact sets 55, 63, 73, 81 reverses the series fields 39 of the respective wheel motors 13, 11, 17, 15. Also, via contact set 145, the input voltage from the main line busses which bucks the rectified alternating current voltage in the motor exciter field circuit is simultaneously reversed. Since both the polarity of the generator shunt field 31 and the direction of current in the generator series field 33 have been reversed, the generator 19 is still differential compound and acts in exactly the same manner as for forward operation. Since the polarity of the motor shunt fields 39 has not changed, but the direction of motor armature current is reversed, and the motor series fields 37 have been reversed, the motors are still cumulative compound and act in exactly the same manner as for forward operation.

Vehicle Dynamic Braking Operation

The dynamic braking action is equally effective for both forward and reverse operation of the vehicle. The dynamic braking action is controlled by operation of the dynamic braking variable resistance controller 127 and the associated switch 185 and relay 113. To accomplish dynamic braking action, the control handle 135 of the dynamic braking controller 127 is simply moved counterclockwise away from the off position (which is the position shown in the drawing) whereupon the spring biased switch 185 immediately closes, energizing the dynamic braking relay 113. Contact 195 of the relay opens to remove the shunt from the variable resistance; contact 111 opens to open the supply circuit of the generator exciter shunt field 125; contact 191 closes to energize the coils of relays 207 which close their contacts 201 to shunt most of the turns of the respective motor series fields 37; and contact 193 closes to connect the resistance grid 219 in parallel with the main line busses 43, 47. Under these conditions the motors are all acting as generators, with the excitation of their shunt fields 39 now being additionally controlled by the variable resistance 129 of the potentiometer 127, which is in series with the motor exciter shunt field 141. As the control handle 135 is moved further in the counterclockwise direction, more series resistance is removed from the motor exciter field circuit, thus increasing the shunt field excitation of the motors (now acting as generators) and in effect increasing their load and causing them to slow down. Thus, movement of the control handle 135 counterclockwise increases the dynamic braking effect, and moving it clockwise decreases the dynamic braking effect. Most of the turns of the motor series fields 37 are shunted during the dynamic braking operation, since the series fields 37 are in bucking relation to the shunt fields 39 during dynamic braking and would decrease the effectiveness of the motors when they are acting as generators. The few series field turns left in bucking operation tend to prevent overloading of the motors during dynamic braking. The power generated by the wheel motors during dynamic braking is dissipated by the combination of the resistance grid 219 and the generator 19 which is now acting as an inefficient series motor driving the internal combustion engine 25. The efficiency of the generator 19 as a series motor is such that it will drive the load provided by internal combustion engine 25 within a narrow range of speeds near the normal engine operating speed. This means that the engine is ready at all times to immediately pick up its generator load when the dynamic brake is removed.

It should be apparent from the foregoing that the vehicle control system and arrangement of my invention provides excellent operation and control for the vehicle under all conditions. The only control manipulation required of the vehicle operator is the main controller handle 115, and the dynamic braking handle 135. The single main controller handle provides vehicle forward and reverse operation, and the dynamic brake can be applied at any time without regard for the position of the main controller handle.

All control operations are accomplished with a minimum of switch and relay action, and all switching is done at very low current levels. Dynamic braking is effectively accomplished without the necessity of switching various combinations of load dissipating resistance sections in or out, and without opening the main line busses to insert series resistance. The transitions from forward to reverse and from running to dynamic braking and vice versa are all accomplished smoothly and effectively.

It will be understood that the showings of specific switches, relays, rectifiers, controllers, direct current voltage sources and the like are schematic only, and may be modified in various ways as will be apparent to those skilled in the art, without departing from the principles of the invention. Thus, the foregoing disclosure and the showings made in the drawings are merely illustrative of the principles of my invention and are not to be interpreted in a limiting sense.

I claim:

1. A control system for an electrically powered self-propelled vehicle comprising in combination: an engine; a differential compound direct current generator having a series field, a shunt field and output terminals; a generator exciter having a field winding; a motor exciter having a field winding; means mechanically coupling said generator and exciters to said engine; a plurality of electric wheel motors of the direct current cumulative compound type, each having a shunt field, a series field, and input terminals; conductor means connecting said generator output terminals and the respective input terminals of said motors in parallel; relay actuated contact means for reversing the polarity of the series fields of said motors; means for actuating said contact means to reverse said motor series fields when a change of voltage polarity of said conductor means occurs; means for supplying direct current voltage of selectable polarity and magnitude to said generator exciter field winding; means for supplying a direct current voltage of predetermined magnitude in the circuit of said motor exciter field; and means for supplying the voltage which appears across said conductor means in the circuit of said motor exciter field winding in bucking relation to said voltage of predetermined magnitude regardless of the polarity of said conductor means voltage.

2. A control system for an electrically powered self-propelled vehicle comprising in combination: an engine; a differential compound direct current generator having a series field, a shunt field and output terminals; a generator exciter having a field winding; a motor exciter having a field winding; means mechanicaly coupling said generator and exciters to said engine; a plurality of electric wheel motors of the direct current cumulative compound type, each having a shunt field, a series field, and input terminals; a pair of main conductor terminals; means connecting said generator output terminals and the respective input terminals of said motors in parallel to said main conductor terminals; relay actuated contact means for reversing the polarity of the series fields of said motors; polarity sensing means for actuating said contact means to reverse said motor series fields responsive to a change of voltage polarity at said main conductor terminals; means for supplying direct current voltage of selectable polarity and magnitude to said generator exciter field winding; means for supplying a direct current voltage of predetermined magnitude in series with said motor exciter field winding; means for supplying the voltage at said main conductor terminals through a relay actuated reversing switch in series with said voltage of predetermined magnitude and in bucking relation thereto; and means associated with said polarity sensing means for actuating said reversing switch responsive to a change of polarity at said main conductor terminals.

3. A control system for an electrically powered self-propelled vehicle comprising in combination: an engine; a differential compound direct current generator having a series field, a shunt field and output terminals; means for supplying excitation of selectable polarity and magnitude to said generator shunt field; a motor exciter having a field winding; means mechanically coupling said generator to said engine; a plurality of electric wheel motors, each having a shunt field and input terminals; a pair of main conductor terminals; means connecting said generator output terminals and the respective input terminals of said motors in parallel to said main conductor terminals; means for supplying a direct current voltage of predetermined magnitude in series with said motor exciter field winding; means for supplying the voltage at said main conductor terminals through a relay actuated reversing switch in series with said voltage of predetermined magnitude and in bucking relation thereto; and means for sensing the polarity of voltage at said main conductor terminals and actuating said reversing switch responsive to a change of polarity at said main conductor terminals.

4. A control system for an electrically powered self-propelled vehicle comprising in combination: an engine; a differential compound direct current generator having a series field, a shunt field and output terminals; means for supplying excitation of selectable polarity and magnitude to said generator shunt field; a motor exciter having a field winding; means mechanically coupling said generator to said engine; a plurality of electric wheel motors, each having a shunt field and input terminals; a pair of main conductor terminals; means connecting said generator output terminals and the respective input terminals of said motors in parallel to said main conductor terminals; means for supplying a direct current voltage of predetermined magnitude in the circuit of said motor exciter field; and means for supplying the voltage at said main conductor terminals in the circuit of said motor exciter field winding in bucking relation to said voltage of predetermined magnitude regardless of the polarity of the voltage at said main conductor terminals.

5. A control system for an electrically powered self-propelled vehicle comprising in combination: an internal combustion engine; a differential compound direct current generator having a series field, a shunt field and output terminals; a generator exciter having a field winding; a motor exciter having a field winding; means mechanically coupling said generator and exciters to said engine; a plurality of electric wheel motors of the direct current cumulative compound type, each having a shunt field, a series field, and input terminals; a pair of main conductor terminals; means connecting said generator output terminals and the respective input terminals of said motors in parallel to said main conductor terminals; relay actuated contact means for reversing the polarity of the series fields of said motors; polarity sensing means for actuating said contact means to reverse said motor series fields responsive to a change of voltage polarity at said main conductor terminals; means for supplying direct current voltage of selectable polarity and magnitude to said generator exciter field winding; means for supplying a direct current voltage of predetermined magnitude in series with said motor exciter field winding; means for supplying the voltage at said main conductor terminals through a relay actuated reversing switch in series with said voltage of predetermined magnitude and in bucking relation thereto; means associated with said polarity sensing means for actuating said reversing switch responsive to a change of polarity at said main conductor terminals; a dynamic braking controller including a variable resistance connected in series with said motor exciter field winding and having an off position; a dynamic braking relay having first and second normally closed contacts, and first and second normally open contacts; conductors connecting said first normally closed contact in shunt with said variable resistance; conductors connecting said second normally closed contact in series with said generator exciter field excitation supply; a series field reducing relay associated with each said motor and having a normally open contact and energizing means; conductor means connecting said last mentioned normally open contact in shunt with the major portion of the turns of the respective motor series field; conductor means connecting said first normally open contact in series with said series field reducing relay energizing means; a dynamic braking resistance grid; conductor means connecting said second normally open contact in series with said resistance grid across said main conductor terminals; energizing means for said dynamic braking relay; and switch means operative responsive to movement of said dynamic braking controller from its off position for closing the circuit of said dynamic braking relay energizing means.

6. A control system for an electrically powered self-propelled vehicle comprising in combination: an internal combustion engine; a differential compound direct current generator having a series field, a shunt field and output terminals; means for supplying excitation of selectable polarity and magnitude to said generator shunt field; a motor exciter having a field winding; means mechanically coupling said generator to said engine; a plurality of electric wheel motors, each having a shunt field and input terminals; a pair of main conductor terminals; means connecting said generator output terminals and the respective input terminals of said motors in parallel to said main conductor terminals; means for supplying a direct current voltage of predetermined magnitude in the circuit of said motor exciter field; means for supplying the voltage at said main conductor terminals in the circuit of said motor exciter field winding in bucking relation to said voltage of predetermined magnitude regardless of the polarity of the voltage at said main conductor terminals; a dynamic braking controller including a variable resistance connected in series with said motor exciter field winding and having an off position; a dynamic braking relay having first and second normally closed contacts and a normally open contact; conductors connecting said first normally closed contact in shunt with said variable resistance; conductors connecting said second normally closed contact in series with said generator field excitation supply; a dynamic braking resistance grid; conductor means connecting said normally open contact in series with said resistance grid across said main conductor terminals; energizing means for said dynamic braking relay; and switch means operative responsive to movement of said dynamic braking controller from its off position for closing the circuit of said dynamic braking relay energizing means.

7. A dynamic braking system for an electrically powered self-propelled vehicle comprising in combination: an internal combustion engine; a direct current generator having a series field, a shunt field and output terminals; means for supplying excitation to said generator shunt field; means mechanically coupling said generator to said engine; a plurality of electric wheel motors, each having a shunt field and input terminals; a pair of main conductor terminals; means connecting said generator output terminals and the respective input terminals of said motors in parallel to said main conductor terminals; a dynamic braking resistance grid; and means effective during dynamic braking for reducing the excitation of said generator shunt field and connecting said resistance grid in parallel with said main line terminals, whereby a portion of the energy generated by said motors will be dissipated in said resistance grid and a portion will be utilized to operate said generator as a series motor driving said internal combustion engine.

8. A dynamic braking system for an electrically powered self-propelled vehicle comprising in combination: an internal combustion engine; a differential compound direct current generator having a series field, a shunt field and output terminals; means for supplying excitation to said generator shunt field; means mechanically coupling said generator to said engine; a plurality of electric wheel motors of the direct current cumulative compound type, each having a shunt field, a series field, and input terminals; a pair of main conductor terminals; means connecting said generator output terminals and the respective input terminals of said motors in parallel to said main conductor terminals; a dynamic braking resistance grid; and means effective during dynamic braking for reducing the excitation of said generator shunt field, connecting said resistance grid in parallel with said main line terminals, and shunting a major portion of the turns of said motor series fields, whereby a portion of the energy generated by said motors will be dissipated in said resistance grid and a portion will be utilized to operate said generator as a series motor driving said internal combustion engine.

No references cited.